H. Murch,

3. Sheets. Sheet. 1.

Mop Head.

No. 3322,

Reissued Mar. 9. 1869.

Colby Brothers & Company
Assignees of Harvey Murch

By their Attorney.
A. B. Stoughton

N. PETERS, PHOTO-LITHOGRAPHER, WASHINGTON, D. C.

Holder
Mop Heads.

3 sheets Sheet 2

CLASSIFICATION
No 32 2
DIVISION.

Reissue
Mar. 9/69

Reissued
Mar 9 1869

15. BRUSHING AND SCRUBBING.
Holders.
Mop Heads.

3 Sheets Sheet 3

CLASSIFICATION
No. 33 2 2
REVISION.

Reissue
Mar. 9/69

Witnesses
Mar 9 1869
Inventor

UNITED STATES PATENT OFFICE.

COLBY BROTHERS AND COMPANY, OF WATERBURY, VERMONT, ASSIGNEES, BY MESNE ASSIGNMENTS, OF HARVEY MURCH.

IMPROVED MOP-HEAD.

Specification forming part of Letters Patent No. 3,188, dated June 14, 1853; extended seven years; Reissue No. 2,957, dated June 2, 1868; Reissue No. 3,188, dated November 10, 1868; Reissue No. 3,322, dated March 9, 1869.

*To all whom it may concern:*

Be it known that HARVEY MURCH, of Lebanon, in the county of Grafton and State of New Hampshire, did obtain Letters Patent of the United States, dated 14th June, 1853, for an Improved Mop-Head, which Letters Patent were extended for seven years from the 14th of June, 1867, and by virtue of assignments, duly recorded in the United States Patent Office, reissued on the 2d of June, 1868, to COLBY BROTHERS AND COMPANY, in two patents, numbered, respectively, 2,957 and 2,958; that the Reissued Patent No. 2,957 was surrendered and reissued to the said COLBY BROTHERS & Co. on the 10th day of November 1868, and numbered 3,188, who, for the further purpose of reissue and correction of said patent, do hereby declare that the following description, taken in connection with the accompanying drawings, will give a full, clear, and exact description of the invention of the said Murch, to which this patent pertains.

Figure 1:
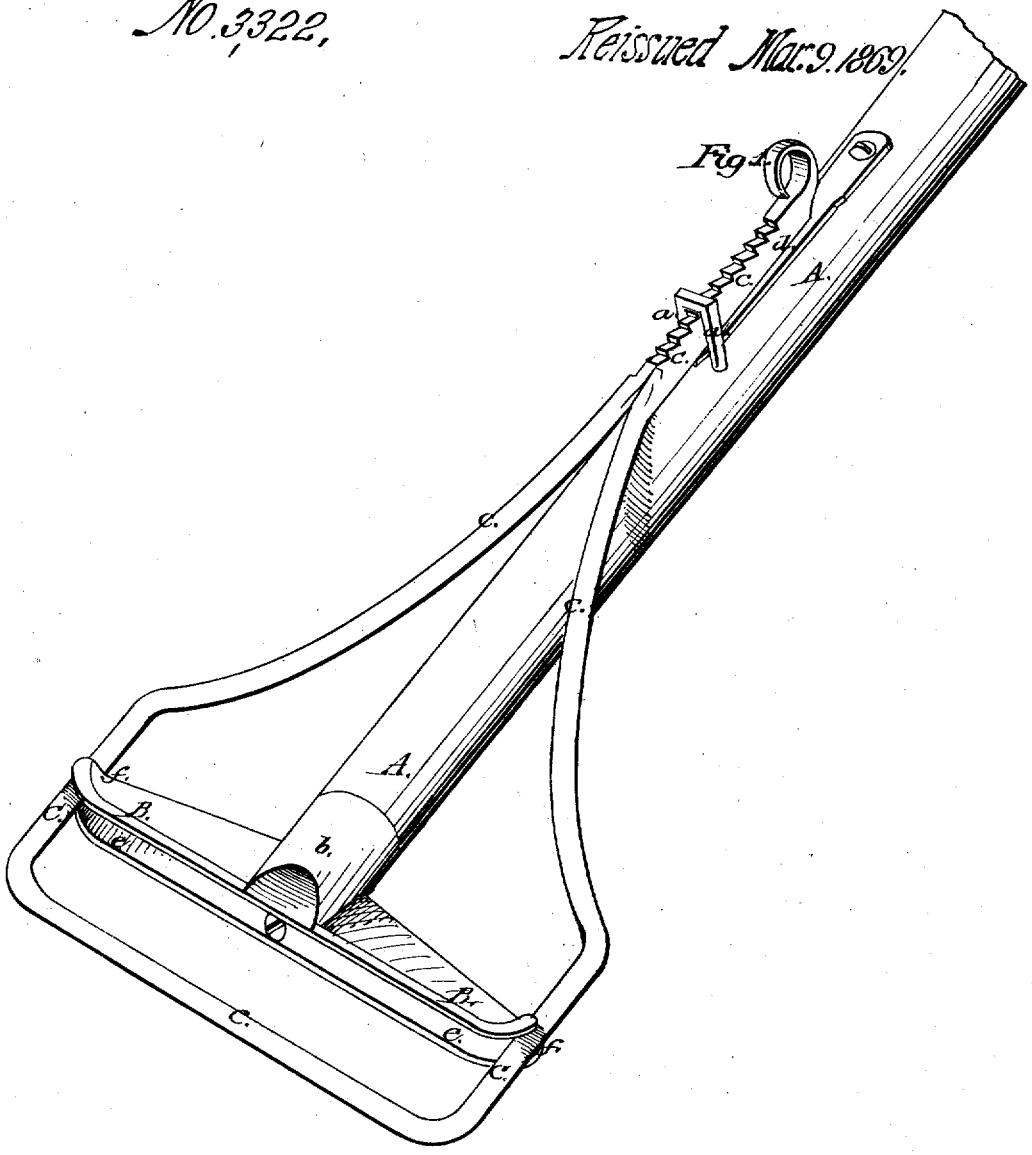
Figure 2:
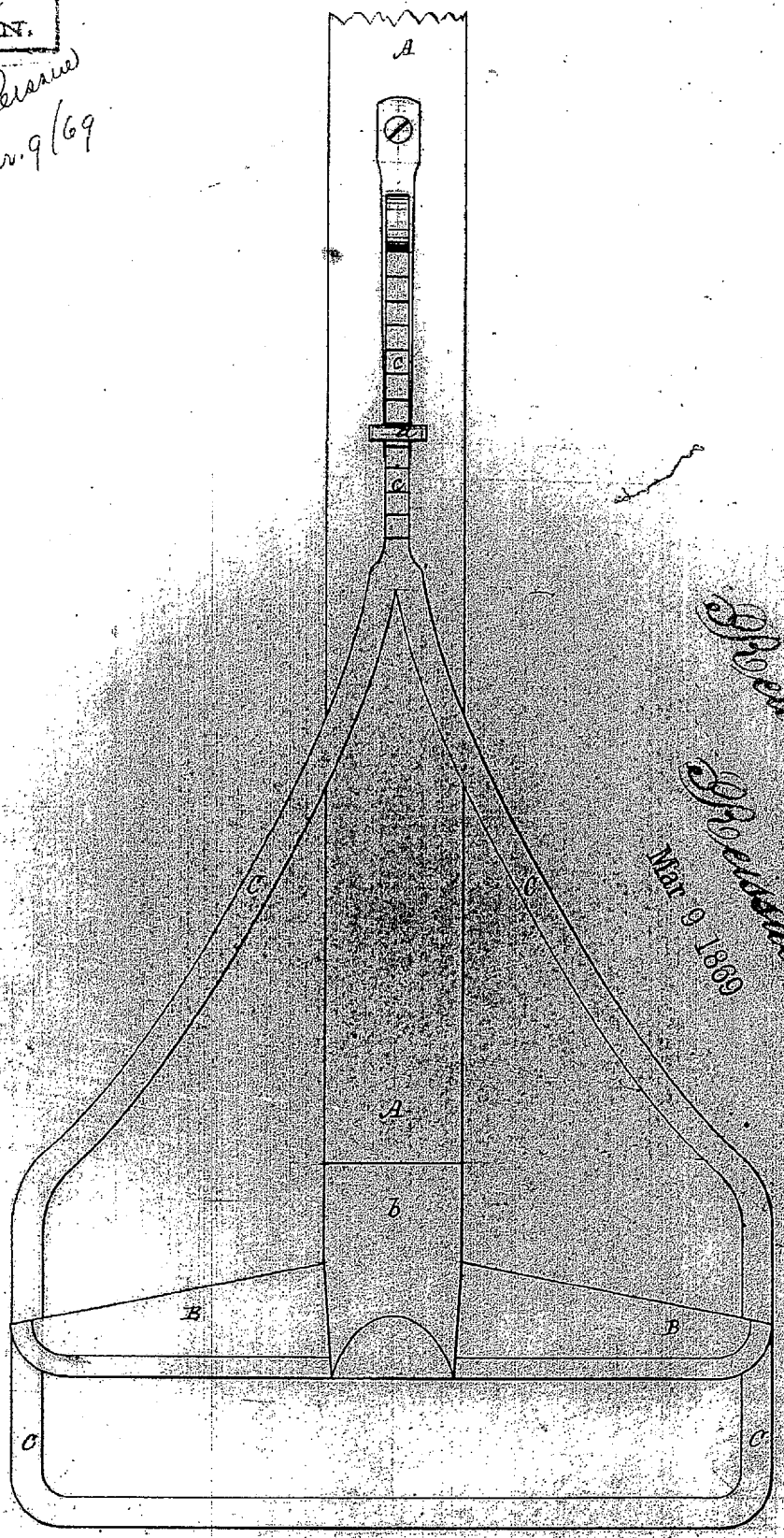
Figure 4:
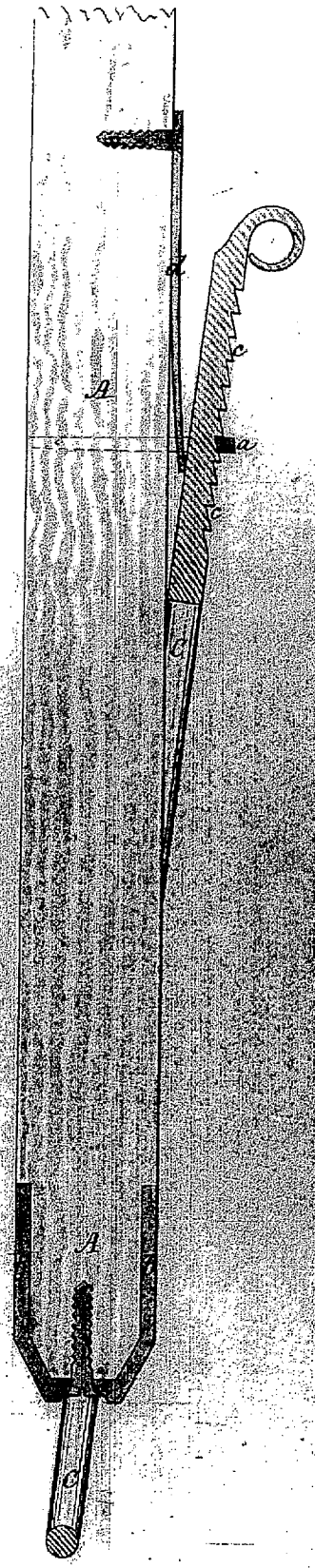
Figure 3:
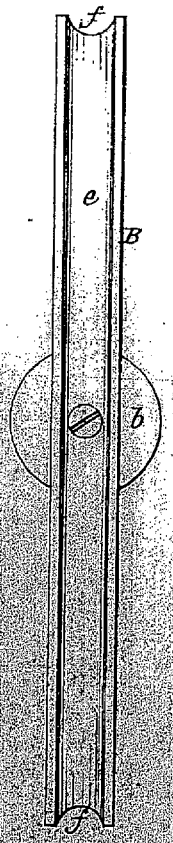

In the drawings, which represent a mop-head and handle made according to the principles of this invention, Figure 1 represents a perspective view of the mop-head and so much of the handle as shows its connection therewith. Fig. 2 represents a plan thereof. Fig. 3 represents an end view of the cross-head; and Fig. 4 represents a longitudinal section through the mop-head, handle, and connecting parts.

Prior to the date of this invention mop-heads were made in which the cross-head was secured in the handle, sometimes by a socket, making part of the cross-head; sometimes by a pin or rod, making part of the cross head and entering a hole in the handle; and mops having socketed cross-heads were provided with a binder screwed at both ends, and having two nuts, which bore upon the ends of the cross-heads. The other kind of cross head was in some cases provided with a binder whose ends were united together somewhat as shown in the drawings, but the united ends were, as far as is known, secured upon the pin or rod, and not upon the handle itself. The mop-head invented by the said MURCH combines some of these old features and has some new features.

In the mop-head as devised by the said HARVEY MURCH, the cross-head B is provided with a socket, *b*, the whole made, by preference, in one piece, driven upon and inclosing the end of the handle A, the attachment of the cross-head to the handle being thus strong and tolerably firm—much stronger than if a bolt or pin attached to or making a part of the cross-head entered a hole in the handle. This kind of cross-head, which is called a "socket cross-head," is, by preference, grooved at the two ends, to guide and steady the binder at *f f*, and also longitudinally, from end to end, as at *e*, (see Fig. 3,) so as to grip more firmly the rags, fibers, &c., of the mop. The binder, as shown at *c c*, has the two ends thereof united, so that a single fastening will hold the whole binder in place, compressing or clamping the rags, pieces of rope, fibers, &c., between it and the cross-head; and it is preferred to secure the binder, not to the socket, but to the handle, for the reason that when so secured those parts of the binder extending from the ends of the cross-head form, when the rags, &c., are compressed or clamped, braces or guys extending from the cross-head to the handle, thereby aiding in holding or sustaining the cross-head in place, strengthening it to resist concussions during use, and, if the socket should become loose, actually sustaining and bracing the cross-head firmly in place. If the united ends of the binder were secured to the socket, they would only strengthen the cross-head and not perform the other offices.

The end of the binder, shown in the drawings, is notched at *c c*, as there represented, and is pressed by a spring, *d*, against the staple-catch *a*, the object of the whole contrivance being to confine or secure the binder in such a position as to compress or clamp the rags, &c., to prevent the ends thereof from moving laterally or crosswise of the handle to any great extent, and to permit of motion, when desired, in the direction of the length of the handle, so that rags, fibers, &c., constituting the mop, may be clamped and unclamped.

We do not claim as the invention of HARVEY MURCH either a socketed cross-head by itself or a binder having the two ends united through an intervening piece, so that a single fastening will hold it in place; nor do we claim fastening the binder upon a shaft between the handle and socketed cross-bar; but We do claim—

1. The combination of a rigid binder having the ends connected so as to form a circuit around the cross-head and secured by a rigid fastening with a metallic cross-head socketed for the reception of the handle, substantially as described.

2. The combination of a metallic cross-head and handle with a rigid metallic binder, which surrounds the cross-head and reaches to and is secured on the handle, and passes the joint between the cross-head and handle, so as to serve as a brace to strengthen and support the cross-head, substantially as described.

COLBY BROTHERS AND COMPANY,

By GEO. J. COLBY,
*President.*

Witnesses:
CURTIS WELLS,
CHARLES WELLS.